United States Patent
Kurimoto et al.

(10) Patent No.: US 7,629,023 B2
(45) Date of Patent: Dec. 8, 2009

(54) RUST INHIBITOR

(75) Inventors: Yuko Kurimoto, Osaka (JP); Kazuo Kobayashi, Moriguchi (JP)

(73) Assignee: Primet Technology Inc., Tokyo (JP)

( * ) Notice: Subject to any disclaimer, the term of this patent is extended or adjusted under 35 U.S.C. 154(b) by 706 days.

(21) Appl. No.: 10/525,032

(22) PCT Filed: Sep. 30, 2002
(Under 37 CFR 1.47)

(86) PCT No.: PCT/JP02/10220

§ 371 (c)(1),
(2), (4) Date: Feb. 28, 2006

(87) PCT Pub. No.: WO2004/018732

PCT Pub. Date: Mar. 4, 2004

(65) Prior Publication Data

US 2006/0214136 A1  Sep. 28, 2006

(30) Foreign Application Priority Data

Aug. 20, 2002  (JP) .............................. 2002-239045

(51) Int. Cl.
| | | |
|---|---|---|
| B05D 1/12 | (2006.01) | |
| B05D 1/00 | (2006.01) | |
| B05D 3/00 | (2006.01) | |
| C09K 15/02 | (2006.01) | |
| C09K 15/04 | (2006.01) | |
| C23F 11/00 | (2006.01) | |
| C23F 11/10 | (2006.01) | |
| C23F 11/18 | (2006.01) | |

(52) U.S. Cl. .................. 427/192; 427/201; 427/216; 427/217; 427/219; 427/320; 427/328; 427/383.7; 427/388.1; 252/387; 252/397; 106/14.21; 106/14.24; 106/14.33; 106/14.39; 148/243; 148/275; 148/285; 148/705

(58) Field of Classification Search .................. 252/387, 252/397; 148/243, 275, 285; 106/14.21, 106/14.24; 427/192, 201, 433
See application file for complete search history.

(56) References Cited

U.S. PATENT DOCUMENTS

| | | | | | |
|---|---|---|---|---|---|
| 2,768,993 | A | * | 10/1956 | Drummond ................. | 524/780 |
| 5,130,167 | A | * | 7/1992 | Mitsuji et al. ............. | 427/407.1 |
| 5,284,919 | A | * | 2/1994 | Nakai et al. ................ | 525/195 |
| 6,485,550 | B2 | * | 11/2002 | Hirose ...................... | 106/14.44 |
| 7,138,184 | B2 | * | 11/2006 | Clerici et al. .............. | 428/447 |
| 7,189,465 | B2 | * | 3/2007 | Endo et al. ................. | 428/626 |
| 2001/0022149 | A1 | * | 9/2001 | Hirose ...................... | 106/14.11 |

FOREIGN PATENT DOCUMENTS

| | | |
|---|---|---|
| JP | A-58-161779 | 9/1983 |
| JP | A-60-072954 | 4/1985 |
| JP | A-61-098773 | 5/1986 |
| JP | A-06-001952 | 1/1994 |
| JP | A 2001-124303 | 5/2001 |
| JP | A 2002-035686 | 2/2002 |
| JP | A-2002-177879 | 6/2002 |

* cited by examiner

*Primary Examiner*—Joseph D Anthony
(74) *Attorney, Agent, or Firm*—Oliff & Berridge, PLC

(57) ABSTRACT

A rust inhibitor which ensures the simplicity of application typical for a coating process and can demonstrate excellent characteristics similar to those obtained with a metal spraying method. The rust inhibitor is manufactured by admixing zinc and aluminum as fine powders of inorganic metals, which are manufactured with a stamping mill to have a flaky shape, to a modified silicone resin solution. A silane-type silicone resin is used for the modified silicone resin solution. For example, a mixed solution of an organosilane-type silicone resin and an oligomer-type silane coupling agent and the like is used.

14 Claims, No Drawings

RUST INHIBITOR

TECHNICAL FIELD

The present invention relates to a rust inhibitor, more particularly to a rust inhibitor which ensures the simplicity of application typical for a coating process and can demonstrate excellent characteristics similar to those obtained with a metal spraying method.

BACKGROUND ART

Conventional methods for inhibiting corrosion (rust formation) of iron and steel materials include a coating method in which contact with oxygen, sulfides, halides, and the like is prevented by a surface coating composed of a paint or other organic materials, a zinc plating method in which the processing object is dipped for a certain time into molten zinc and the zinc is caused to adhere thereto, and a metal spraying method in which zinc and aluminum are melted and caused to adhere as a composite film to the surface of an iron or steel structure and the oxidation with time is suppressed and endurance is improved correspondingly to the thickness of the formed coating by using the sacrificial anode reaction.

The following problems were associated with the above-described corrosion protection methods that have been conventionally implemented. Thus, in the coating method, because the organic solvent coating was used, hardness was insufficient, the function of shielding the metal surface form air was degraded due to surface damage or wear-induced defects, and corrosion occurred as a result of weathering, UV degradation, outer damage and the like.

With the zinc plating method, corrosion protection performance could be demonstrated for about 10 years, but a large plant suitable for dipping was required to implement the method and the method could not be adapted to maintain the existing iron and steel structures. Furthermore, it could not be employed with thin steel sheets and long steel materials due to problems associated with melting temperature and dipping pool. In recent years, the establishment of technology for zinc-aluminum alloy plating has been advanced, but the cost of equipment such as ceramic furnaces was high and cost efficiency of the process created a problem. Moreover, in the zinc-aluminum alloy plating, the size of aluminum crystal grains differed due to a difference in the cooling rate of zinc and aluminum. The resultant problem associated with characteristics was that the so-called grain boundary corrosion could easily occur.

The metal spraying method demonstrated a level of protection higher than that attained with zinc plating because the metal of internal zones was protected by a sacrificial anode reaction. However, mechanical equipment for metal spraying (spraying gun, power source unit, air blowing unit, wire coiling-uncoiling unit, spray extension cord, and the like) was required. Furthermore, the process efficiency was also dependent on the technological skills of the operator, and at a daily processing surface area of about 30 $m^2$, transportation and preparation of equipment placed a large load on the operator, thereby creating the necessity to examine the profitability of the process. Yet another problem was that spraying on the already installed structures and processing of narrow structural components were difficult. Moreover, in order to cause forcible adhesion of molten zinc and aluminum to the surface of the processing object, the surface of iron and steel structures had to be pretreated by shot blasting or with a surface roughening agent so that the anchor effect be demonstrated.

Accordingly, it is an object of present invention to provide a rust inhibitor which is capable of resolving the above-described problems, while realizing the advantages of the conventional methods for corrosion protection, that is, a rust inhibitor which ensures the simplicity of application typical for a coating process and can demonstrate excellent characteristics similar to those obtained with a metal spraying method.

DISCLOSURE OF THE INVENTION

In order to resolve the aforementioned problems, the present invention employs the following feature. Thus, the rust inhibitor in accordance with the present invention is prepared by mixing zinc and aluminum formed to have a flaky shape with a modified silicone resin solution.

If a rust inhibitor is thus prepared by mixing zinc and aluminum formed to have a flaky shape with a modified silicone resin solution, one of the functional groups of two types with different reactivity that are had by the modified silicone resin solution is chemically bonded to the flaky zinc and aluminum by mutual hydrolysis of respective hydroxyl groups thereof and partially condensed, producing a state (chemical bonding state such as Al—O—Si—OR) in which flaky zinc and aluminum are admixed in the form of a binder. If the rust inhibitor is coated in this state on the surface of iron or steel structure, then the other functional group of the modified silicone resin solution is bonded to the Fe hydroxyl group of the surface of iron or steel structure, hydrolyzed, and adsorbed via a hydrogen bonding mechanism. Subsequent drying produces strong chemical bonds (Fe—O—Si—OR) by a dehydrocondensation reaction. As a result of such an action, a flaky zinc-aluminum binder layer is finally formed on the surface of the iron or steel structure in a state in which dissimilar metals are bonded to each other.

BEST MODE FOR CARRYING OUT THE INVENTION

The preferred embodiment of the present invention will be described below. The rust inhibitor in accordance with the present invention is manufactured by admixing zinc and aluminum as fine powders of inorganic metals formed to have a flaky shape to a modified silicone resin solution. The size of those zinc and aluminum formed to have a flaky shape is preferably 150-300 mesh, but it is more preferred that both zinc and aluminum have a size of 180 mesh which would be stacked alternately in the form of annual rings in the present rust inhibitor. The fine powders of zinc and aluminum are manufactured with a stamping mill, without employing an atomization method or electrolytic method, and formed to have a flaky shape, such a process producing more refined crystal grains of the metal. Stacking the fine powders alternately in the form of annual rings produces an optimum rust inhibitor effect based on a sacrificial anode effect. This is because the standard single electrode potential of aluminum is −1.662 V, standard single electrode potential of zinc is −0.762 V, and standard single electrode potential of iron is −0.447 V, and a difference in potential is generated therebetween.

Further, when the zinc and aluminum formed to have a flaky shape are mixed with a modified silicone resin solution, it is necessary to conduct purification by removing other substances that adhered to the flaky zinc and aluminum, for example, stearic acid. This treatment is conducted to suppress excess chemical reactions when an inorganic solution is admixed.

A silane-type silicone resin is used for the modified silicone resin solution of the present rust inhibitor; for example, a mixed solution of an organosilane-type silicone resin and an oligomer-type silane coupling agent and the like is suitable.

More specifically, an organosilane of a demethanolization-curable methyl-type silicone resin solution comprising a curing catalyst (a silicone resin comprising organosilsesquioxane based skeleton having three functional groups as a base configuration) or an alkoxy oligomer having a methoxy group of reactive alkoxysilyl groups (Si—OR) are used individually or both resins are used together. Alternatively, an aluminum alkoxide $Al(OR)_3$ is mixed with those resins and an alcohol is further admixed to obtain the mixed solutions of various compositions. Further, the viscosity of solution of 22-25 $mm^2/S$ at a temperature of 25° C. is optimum from the standpoint of chemical reactions and coatability of the solutions and finely powdered metals, and obtaining such a viscosity facilitates the preparation of a coating material.

If a rust inhibitor is thus prepared by mixing zinc and aluminum formed to have a flaky shape with a modified silicone resin solution, one of the functional groups of two types with different reactivity that are had by the modified silicone resin solution is chemically bonded to the flaky zinc and aluminum by mutual hydrolysis of respective hydroxyl groups thereof and partially condensed, producing a state (chemical bonding state such as Al—O—Si—OR) in which flaky zinc and aluminum are admixed in the form of a binder.

If the rust inhibitor is coated in this state on the surface of iron or steel structure, then the other functional group of the modified silicone resin solution is bonded to the Fe hydroxyl group of the surface of iron or steel structure, hydrolyzed, and adsorbed via a hydrogen bonding mechanism. Subsequent drying produces strong chemical bonds (Fe—O—Si—OR) by dehydrocondensation reaction. As a result of such an action, a flaky zinc-aluminum binder layer is finally formed on the surface of the iron or steel structure in a state in which dissimilar metals are bonded to each other, and this layer is crosslinked to the iron surface in a state in which so-called zinc and aluminum are stacked three-dimensionally and alternately due to an alkoxy oligomer crosslinking reaction, electric conductivity is demonstrated and sacrificial anode function is also demonstrated. Furthermore, because fine powders of zinc and aluminum are formed to have a flaky shape, corrosion on grain boundaries or the like is also prevented if the more refined zinc and aluminum are bonded in a state in which individual metals are stacked alternately.

Because the rust inhibitor in accordance with the present invention has the above-described configuration it can be coated as a paint on the surface of iron and steel structures. Further, because electrically conductive inorganic hard chemical bonds are induced on the surface of iron and steel structures, a rust inhibiting performance identical to that of the surface treatment by a metal spraying method can be demonstrated. Furthermore, because of operability similar to that of paints, mechanical equipment or the like that is required during metal spraying becomes unnecessary and processing can be easily conducted to already installed structures and narrow structural components. Moreover, not only the equipment is unnecessary, but also a pretreatment such as shot blasting serving to melt zinc and aluminum to cause forcible adhesion to the surface of the processing object or by using a surface roughening agent to demonstrate an anchor effect become unnecessary and cost can be reduced.

INDUSTRIAL APPLICABILITY

As clearly described hereinabove, the rust inhibitor in accordance with the present invention ensures the simplicity of application typical for a coating process and can demonstrate sacrificial anode characteristics similar to those obtained with a metal spraying method. Moreover, because dissimilar metals are bonded as individual metals with chemical bonds, rather than by melting zinc and aluminum and forcing to adhere physically to the surface of the processing object, peeling caused, e.g., by strains induced by external stresses is prevented and the endurance can be greatly increased.

The invention claimed is:

1. A method of inhibiting the formation of rust comprising:
preparing zinc flakes of a size ranging from 150 mesh up to 300 mesh and aluminum flakes of the same mesh range;
preparing a rust inhibitor consisting essentially of the zinc flakes, the aluminum flakes, and a modified silicone resin solution;
coating an iron or steel structure with the rust inhibitor; and
drying the coated rust inhibitor.

2. A rust inhibitor consisting essentially of:
zinc flakes of a size ranging from 150 mesh up to 300 mesh;
aluminum flakes of a size ranging from 150 mesh up to 300 mesh; and
a solution of modified silicone resin.

3. A rust inhibitor according to claim 2, wherein the zinc flakes and the aluminum flakes are manufactured from zinc powder and aluminum powder, respectively, with a stamping mill.

4. A rust inhibitor according to claim 2, wherein the modified silicone resin has two types of functional groups with different reactivity.

5. A rust inhibitor according to claim 2, wherein the modified silicone resin solution comprises an organosilane-type silicone resin.

6. A rust inhibitor according to claim 2, wherein the modified silicone resin solution comprises an alkoxy oligomer having an alkoxysilyl group (Si—OR).

7. A rust inhibitor according to claim 2, wherein the modified silicone resin solution comprises a demethanolization-curable methyl-type silicone resin.

8. A rust inhibitor according to claim 2, wherein the modified silicone resin solution comprises an oligomer-type silane coupling agent.

9. A rust inhibitor according to claim 2, wherein the modified silicone resin solution further comprises a curing catalyst.

10. A rust inhibitor according to claim 2, wherein the modified silicone resin solution further comprises an aluminum alkoxide ($Al(OR)_3$).

11. A rust inhibitor according to claim 10, wherein the modified silicone resin solution further comprises at least one alcohol.

12. A rust inhibitor according to claim 2, wherein the viscosity of the modified silicone resin solution is 22-25 $mm^2/S$ at a temperature of 25° C.

13. A rust inhibitor according to claim 2, wherein the zinc flakes and the aluminum flakes are of a size ranging from 150 to 180 mesh.

14. A method for producing a rust inhibitor comprising:
preparing zinc flakes of a size ranging from 150 mesh up to 300 mesh and aluminum flakes of a size ranging from 150 mesh up to 300 mesh from zinc powder and aluminum powder, respectively, using a stamping mill;
mixing the zinc flakes and the aluminum flakes with a solution of modified silicone resin,
wherein the rust inhibitor consists essentially of the zinc flakes, the aluminum flakes, and the modified silicone resin solution.

* * * * *